United States Patent
Ferreira et al.

(10) Patent No.: US 11,721,226 B2
(45) Date of Patent: Aug. 8, 2023

(54) TERRAIN DATABASE CARVING AROUND RUNWAYS

(71) Applicant: Gulfstream Aerospace Corporation, Savannah, GA (US)

(72) Inventors: Sergio Ferreira, Savannah, GA (US); Brendan Moran, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 535 days.

(21) Appl. No.: 16/741,098

(22) Filed: Jan. 13, 2020

(65) Prior Publication Data

US 2021/0217320 A1 Jul. 15, 2021

(51) Int. Cl.
*G08G 5/00* (2006.01)
*G08G 5/02* (2006.01)

(52) U.S. Cl.
CPC ......... *G08G 5/0086* (2013.01); *G08G 5/0013* (2013.01); *G08G 5/0021* (2013.01); *G08G 5/025* (2013.01)

(58) Field of Classification Search
None
See application file for complete search history.

(56) References Cited

U.S. PATENT DOCUMENTS

| | | | | |
|---|---|---|---|---|
| 4,368,517 A | * | 1/1983 | Lovering | G05D 1/0676 701/16 |
| 4,914,436 A | | 4/1990 | Bateman et al. | |
| 5,343,395 A | * | 8/1994 | Watts | G05D 1/0676 701/538 |
| 5,892,462 A | * | 4/1999 | Tran | G05D 1/0646 340/961 |
| 6,980,892 B1 | * | 12/2005 | Chen | G05D 1/0676 701/16 |
| 7,382,287 B1 | * | 6/2008 | Chen | G08G 5/0021 701/16 |
| 8,788,128 B1 | | 7/2014 | McCusker | |
| 9,024,805 B1 | * | 5/2015 | Jinkins | G01S 13/882 342/75 |
| 2001/0056316 A1 | * | 12/2001 | Johnson | G08G 5/0086 701/14 |

(Continued)

OTHER PUBLICATIONS

M. Shidong, H. Yuncheng, W. Zhong and Y. Guoqing, "Researches on simulation and validation of airborne enhanced ground proximity warning system," 2012 IEEE International Conference on Computer Science and Automation Engineering (CSAE), Zhangjiajie, China, 2012, pp. 198-203, (Year: 2012).*

*Primary Examiner* — Aniss Chad
*Assistant Examiner* — Jennifer M Anda
(74) *Attorney, Agent, or Firm* — LKGlobal | Lorenz & Kopf, LLP

(57) ABSTRACT

Vertical resolution and/or vertical accuracy of terrain elevation data near an aircraft runway is adjusted by obtaining local terrain data, yielding a first elevation value for a query location. A processor receptive of the first elevation value computes plane equations based on a predetermined standard model adapted to geometrically conform to the aircraft runway, yielding a second elevation value for the query location. The processor selectively uses the first and second elevation values to generate an adjusted elevation value that is supplied to a terrain avoidance and warning system.

4 Claims, 5 Drawing Sheets

(56) References Cited

U.S. PATENT DOCUMENTS

| | | | | |
|---|---|---|---|---|
| 2004/0030465 | A1* | 2/2004 | Conner | G08G 5/0013 701/16 |
| 2004/0181318 | A1* | 9/2004 | Redmond | G08G 5/0052 701/8 |
| 2005/0015202 | A1* | 1/2005 | Poe | G08G 5/0078 340/945 |
| 2005/0128129 | A1* | 6/2005 | Conner | G08G 5/0013 342/36 |
| 2007/0255729 | A1* | 11/2007 | Schiefele | G01C 21/32 |
| 2008/0288169 | A1* | 11/2008 | Meunier | G05D 1/106 701/301 |
| 2010/0042273 | A1* | 2/2010 | Meunier | G05D 1/0607 701/9 |
| 2010/0211237 | A1* | 8/2010 | Nichols | G08G 5/0086 701/14 |

\* cited by examiner

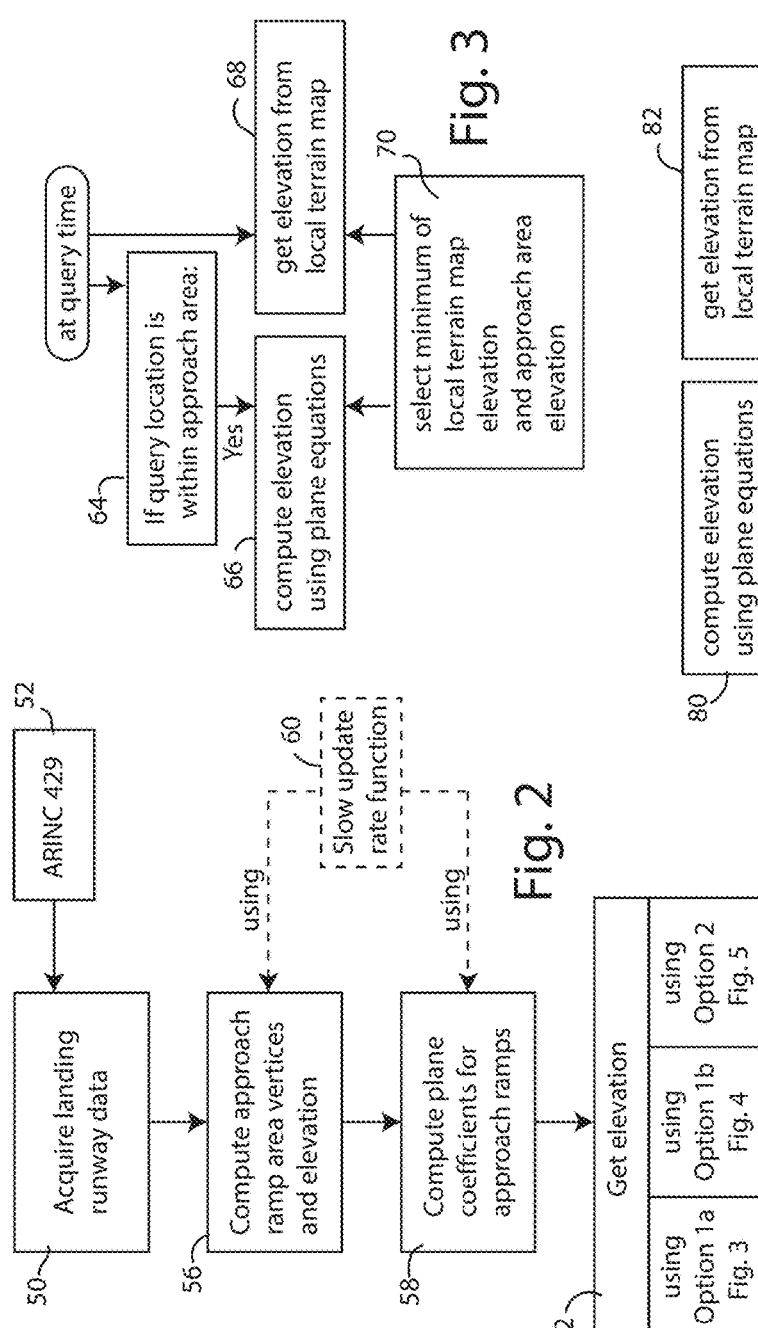
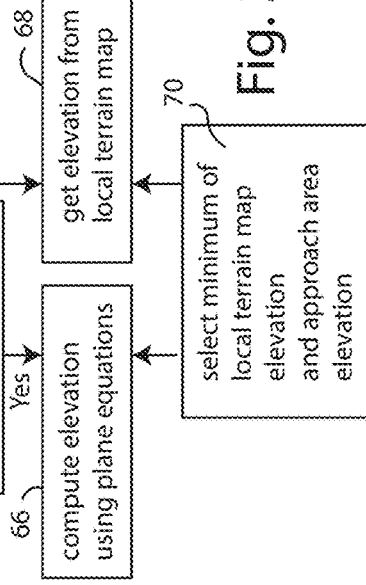
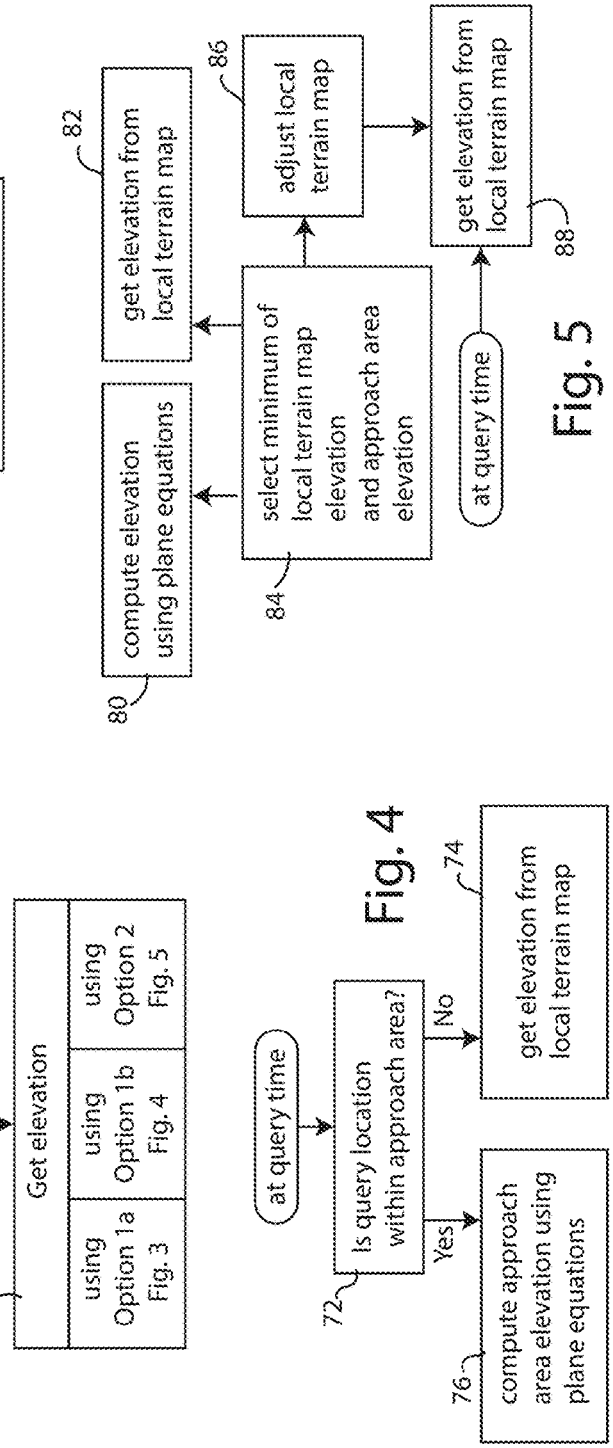
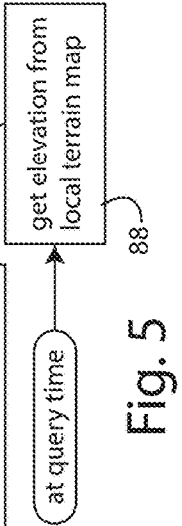

TERRAIN DATABASE CARVING AROUND RUNWAYS

TECHNICAL FIELD

The disclosure relates generally to terrain avoidance and warning systems for aircraft. More particularly, the disclosure relates to a technique to adjust the resolution and/or accuracy of the terrain elevation to be used when the aircraft is near an airport runway.

BACKGROUND

This section provides background information related to the present disclosure which is not necessarily prior art.

Terrain databases used for terrain collision avoidance need to have very good resolution and accuracy near runways to allow the terrain collision avoidance system to remain active until the aircraft touchdown during approach and landing.

However, the size of such a database may be larger than the memory available for the terrain collision avoidance system. Additionally, even if the database provided the adequate resolution, the database accuracy and aircraft systems accuracies may not allow such a system to remain active until touchdown.

A runway database provides additional geolocation information, typically gathered via means independent from a terrain database.

SUMMARY

The disclosed system and method employs an algorithm that uses runway localization (latitude, longitude, and elevation), approach glideslope, acquired in real time, and in conjunction with predefined system accuracies (aircraft elevation sensing accuracies), to define an area near a runway, denominated "runway final approach ramp", which will be used as an additional source of terrain elevation data.

Several options are disclosed. Option 1: The elevation computed using the runway final approach ramp is used as true elevation source in lieu of or in conjunction with the terrain database for terrain queries located within the predefined area. Option 2: Adjust ("carve out") the corresponding area in the terrain database information in the system memory to remove false erroneous terrain that may be present due to low terrain database resolution near runways. The runway approach ramp area is defined considering current international aerodrome design and operation standards, ref. ICAO Annex 14 Volume I.

According to one aspect, the disclosed method adjusts at least one of vertical resolution and vertical accuracy of terrain elevation data near an aircraft runway by obtaining local terrain data yielding a first elevation value stored in memory for a query location. A processor, receptive of the first elevation value computes plane equations based on a predetermined standard model adapted to geometrically conform to the aircraft runway, yielding a second elevation value for the query location. The processor selectively uses the first and second elevation values to generate an adjusted elevation value that is supplied to a terrain avoidance and warning system.

BRIEF DESCRIPTION OF THE DRAWINGS

The drawings described herein are for illustrative purposes only of selected embodiments and not all possible implementations. Thus, the particular choice of drawings is not intended to limit the scope of the present disclosure.

FIG. 2 is a flowchart of a first portion of the algorithm for supplying elevation data within the predefined terrain carving or terrain modifying region proximate the runway, the remainder of the algorithm being provided in FIGS. 3, 4 and 5;

FIG. 3 is a flowchart continuation of the first portion (of FIG. 2), illustrating a first option for determining the elevation data;

FIG. 4 is a flowchart continuation of the first portion (of FIG. 2), illustrating a different first option for determining the elevation data;

FIG. 5 is a flowchart continuation of the first portion (of FIG. 2), illustrating a second option for determining the elevation data;

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

Figure 1:
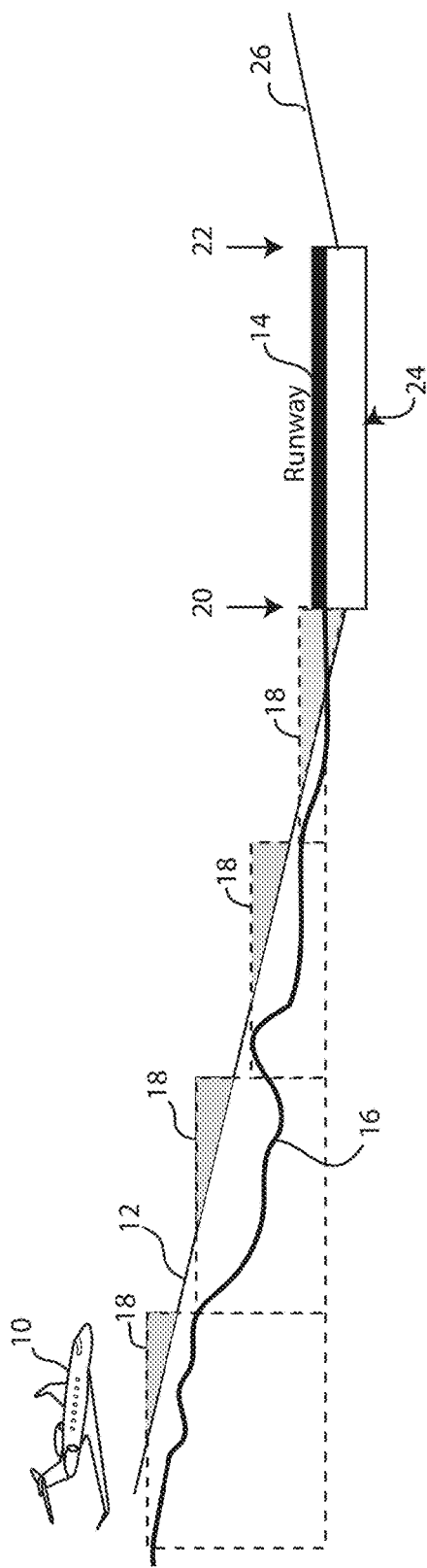
FIG. 1 is a terrain profile of an aircraft in approach for landing, showing the region where the disclosed system operates.

FIG. 1 illustrates the aircraft 10 coming in for a landing along an approach ramp 12 towards runway 14. The actual terrain is represented by profile line 16. As will be explained in more detail below, the terrain collision avoidance system on-board aircraft 10 uses a terrain database that subdivides the earth's surface into grids or tiles, each identified by a particular latitude and longitude associated with a predefined point on the grid (e.g., southwest corner of the grid) and each having a representative elevation datum corresponding to the highest point on the earth's surface within that grid.

When projected upwardly (in the z direction) these grids define rectangular boxes of differing heights (depending on what the highest point of terrain happens to be). In FIG. 1, these rectangular boxes are shown in profile, with the upper bounds representing the elevations at 18; these elevations are stored in the terrain database. Also shown in FIG. 1 is an exemplary approach ramp 26 for aircraft approaching the runway from the opposite direction. In some applications, ramp 26 may also serve when the aircraft initiates a go-around maneuver.

As illustrated, associated with the runway 14 is a base end 20 latitude, longitude and elevation, and a reciprocal end 22 latitude, longitude and elevation. The region between the base end 20 and the reciprocal end 22 is the region 24 to which the terrain carving or terrain modifying algorithm is applied. The terrain carving or terrain modifying algorithm is also applied to eliminate the areas of the terrain database elevations at 18 which are above the approach ramp 12. These areas are shown shaded in FIG. 1.

Resolution, Accuracy and Storage Size Considerations

In this description the terms resolution and accuracy are used. These two terms have different meanings. Resolution refers to the smallest change that can be measured by the system. Accuracy refers to how closely a reported measurement matches the true value being measured.

To illustrate, a system might have a resolution of 1 meter—thus the system is able to resolve the difference between 1 meter and 2 meters, for instance; but is not be able to resolve the difference between 1.1 meters and 0.95 meters. The same system might be configured to store elevation values with an accuracy of 100 meters—thus given a stored elevation of, for example, 234 meters, it could represent any actual elevation from 134 to 234 meters. Thus in this illustration, the system would have a resolution of 1 meter and an accuracy of 100 meters.

Figure 1A:
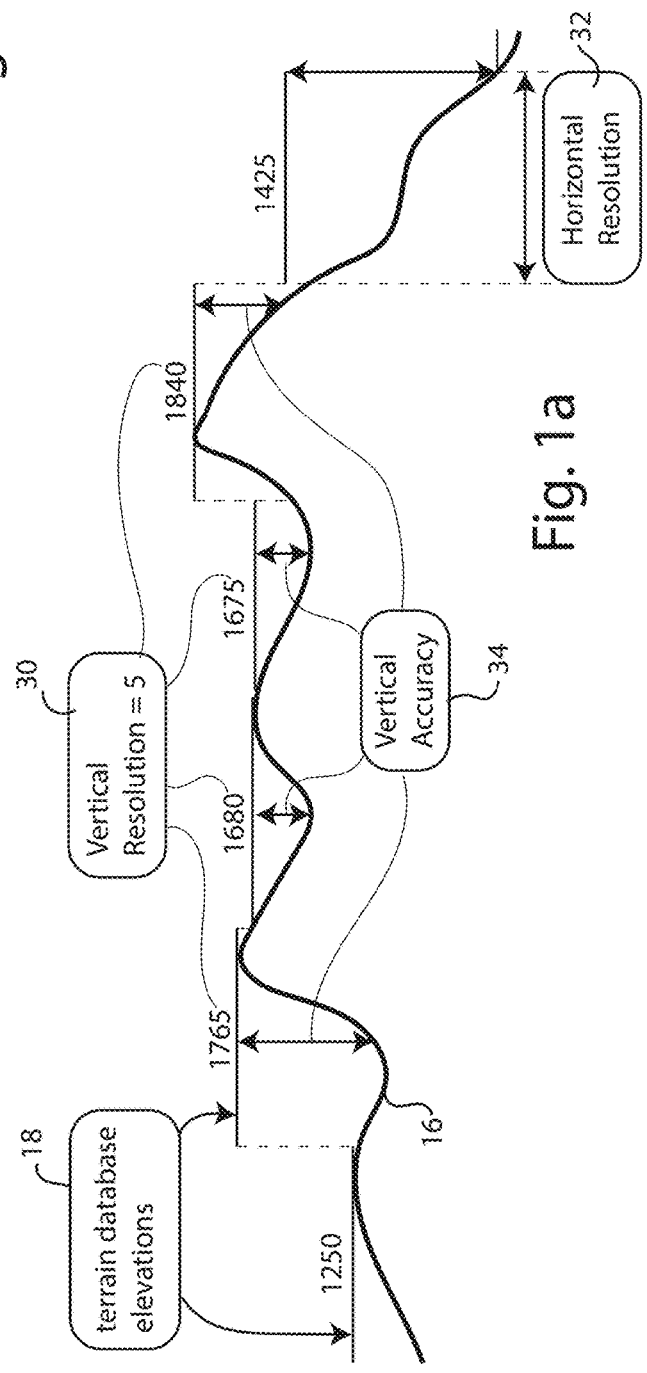
FIG. 1a is an exemplary terrain profile labeled to explain accuracy and resolution concepts.

FIG. 1a illustrates how these concepts of resolution and accuracy are applied in an exemplary terrain collision avoidance system. The actual terrain profile is shown at 16, with exemplary elevation values 18 provided in meters: 1250, 1765, 1680, 1675, 1840 and 1425. These exemplary values are based on the highest elevation points of actual terrain for each grid or tile stored in the database. Note that these exemplary values have a vertical resolution of 5. This can be appreciated because the least significant digit of each stored value is either 0 or 5. FIG. 1a conceptually depicts at 30 the vertical resolution value being used by the illustrated system. Just as vertical resolution 30 is specified by the system, horizontal resolution 32 may likewise be specified. The horizontal resolution specifies how finely horizontal distances can be resolved.

As noted above, accuracy is different from resolution. Thus, in FIG. 1a, the vertical accuracy 34 is a measure of how "correctly" the altitude recorded in the database corresponds to the real world. As shown in FIG. 1a by the vertical arrows, the elevation values stored in the database (e.g., 1250, 1765, 1680 . . . ) will differ from the actual terrain height, except at the highest point. This is because the database stores the highest point elevation to represent the vertical dimension of that entire grid or tile.

In designing a system according to the disclosed concepts, attention is given to selecting resolutions and accuracies that provide good terrain collision avoidance results while keeping data storage requirements reasonable. To illustrate, consider the case where a one meter vertical resolution is implemented. At this resolution, a hill that is 31.3 meters high would be represented as 31 meters high, whereas a slightly higher hill of 31.8 meters would be represented as 32 meters high. Although the vertical resolution dictates how the height of each individual terrain feature is captured, it is the horizontal resolution that dictates what height is stored for each grid or tile. This is because the horizontal resolution dictates the terrain area that will be represented by a single altitude point. If for example the terrain is divided into grids or tiles of 100×100 meters, then the highest point within that 100 meter square would be stored in the database.

A database representing the surface of the earth using 100×100 meter tiles requires several gigabytes of processor storage. If the area of interest is limited to the area around airports, the storage size might be significantly reduced. If finer resolutions were desired around the globe, the storage size expands to several terabytes—which is currently unfeasible for on-board aircraft applications.

Although resolution and accuracy are different properties, there are interdependencies. Notably, a larger horizontal resolution may have the effect of degrading the vertical accuracy; and conversely, a smaller horizontal resolution may have the effect of improving vertical accuracy. This can occur because for a given grid or tile, only one elevation is assigned, based on the tallest feature in that grid or tile; features within the grid of lesser height are effectively ignored. Thus vertical accuracy can be improved by reducing the size of the grid, i.e., reducing the horizontal resolution.

Vertical and horizontal accuracies can also be impacted by the accuracy of the technology being used to measure feature elevations. When the vertical measurement accuracy degrades, there will be a higher degree of error in the elevation value of the highest feature stored in the database. When the horizontal measurement accuracy degrades, there will be a higher degree of error in the latitude-longitude placement of the features being measured. Errors in vertical accuracy and errors in horizontal accuracy do not necessarily go hand in hand. It is possible, for example to measure and properly represent the elevation features of an entire island with good vertical accuracy, and yet have those features appear offset by several hundred meters to the east, for example, due to inaccuracies in the horizontal measurement technology.

In order to meet the countervailing objectives of having good terrain collision avoidance performance and of reducing data storage requirements, an embodiment may be designed to have different vertical and horizontal resolutions depending on proximity to relevant airports. For example, in one embodiment, the following resolutions may be used:

Resolution:
    vertical resolution: 1 meter
    horizontal resolution: 100 meters (close to airports) and 1000 (away from airports) Accuracy:
    vertical accuracy: about 45 meters (near airports) and about 150 meters (away from airports)
    horizontal accuracy: based on terrain conditions The Carving Algorithm The carving algorithm is designed to adjust the resolution and/or accuracy of the terrain database when the aircraft is near an airport. Several techniques may be used, as shown in FIGS. 2-5 discussed below. These techniques compute elevations with better accuracy than stored in the terrain database and selectively use these in lieu of the originally stored terrain data when the aircraft is near the airport runway. This will correspond to infinitesimal vertical and horizontal resolutions when very near a runway (in one embodiment, the computations may use 32-bit floating point numbers, which corresponds to about 8 significant decimal digits, resulting in very good resolution). The accuracy will also be improved in many cases, because the computations will be based on runway database elevation values instead of a terrain database elevation values. Runway database elevation values tend to have better information as they easier to source.

Figure 10:
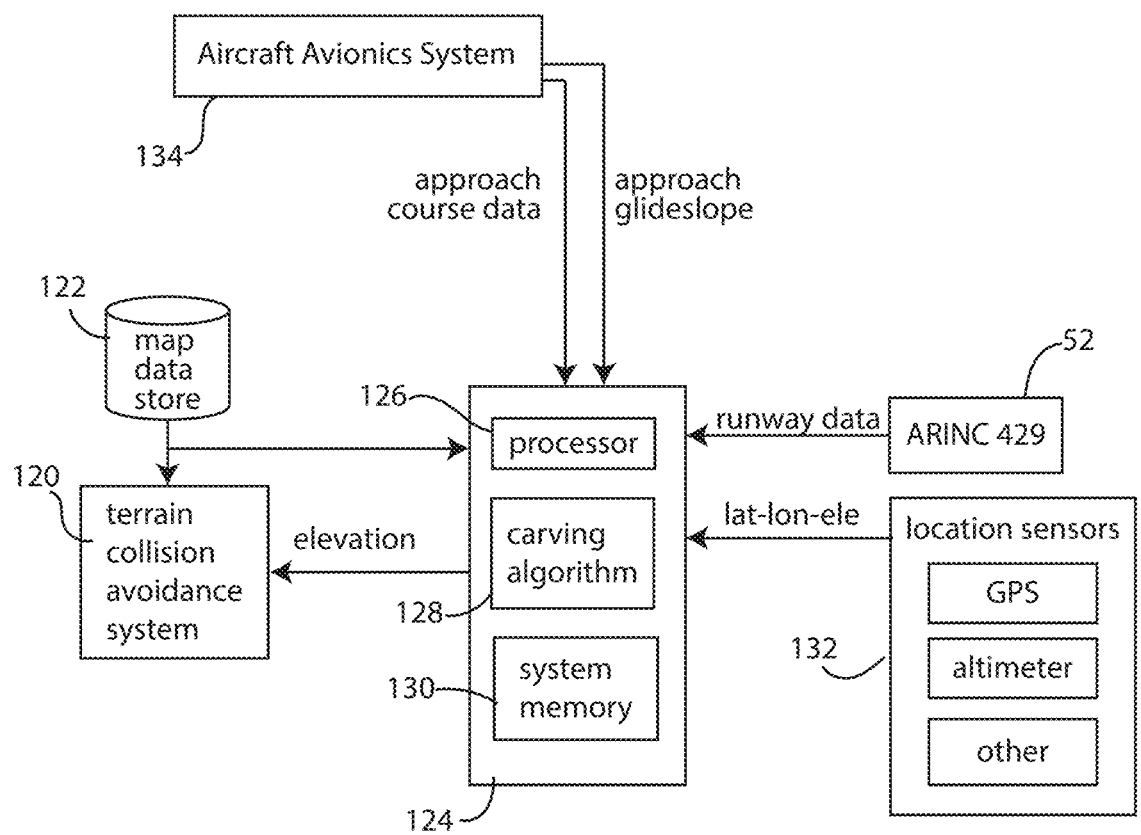
FIG. 10 is a hardware block diagram of an exemplary embodiment of the disclosed system.

The disclosed terrain carving technique may be implemented using a programmed processor, or using other suitable electronic circuits including gate array circuits (e.g., field programmable gate array—FPGA—circuits or other application specific integrated circuits (ASIC). A programmed processor implementation is shown in FIG. 10 and will be described in more detail below. Each of these processor or gate array circuit implementations are programmed and configured to according to the steps shown in FIG. 2, combined with at least one of the steps of FIGS. 3, 4 and 5. Unless otherwise specified, the term processor refers to a processor such as illustrated in FIG. 10 or equivalent electronic circuits such as gate array circuits and the like.

Referring to FIG. 2, the carving algorithm begins at 50 where the processor acquires landing runway data by query to a local source, typically using an ARINC 429 interface 52. ARINC 429 is a data transfer standard for aircraft avionics. In this case local runway data are supplied to the aircraft using this data transfer standard.

A terrain collision avoidance system, which predicts future aircraft trajectories, will have to check if such trajectories will intercept with terrain in the future. "Query location" refers to an airplane location in a future time, where terrain elevation is relevant. In order to predict future aircraft trajectories, the system implements a fast update rate function, which is executed several times a second, to predict future aircraft locations. "Query time" refers to the time within the fast update rate function when terrain elevation needs to be computed in order to check that future aircraft trajectories will not interfere with terrain.

The processor then computes at 56 the approach ramp area vertices and elevations, and then computes plane coefficients for approach ramps at 58, both steps using a set of calculations referred to herein as the slow update rate function 60 discussed more fully below. The name slow update rate function has been chosen because this function may suitably operate at a slow update rate (e.g., on the order of once per second). The processor also implements a fast update rate function that operates at terrain query time. The fast update function handles time-critical decisions.

After the slow update rate function has been performed to implement steps 56 and 58 (FIG. 2), several different alternative embodiments are possible, as illustrated by step 62, to get the elevation data that will be used for terrain collision avoidance in near proximity to the runway. FIGS. 3 and 4 illustrate two embodiment options that query the ramp to get the elevation data, while FIG. 5 illustrates an embodiment option that gets elevation data by carving the local terrain map. Here the local terrain map refers to the portion of the terrain database near the airplane that is currently loaded in volatile computer memory for processing purposes.

With reference to FIG. 3 (showing Option 1a), at query time 54, the processor tests at step 64 whether the query location is within the approach area. If the query location is within the approach area, the processor at 66 computes and stores the elevation data using the plane equations calculated in steps 56 and 58 (FIG. 2). In addition, the processor at 68 also gets the elevation data from the local terrain map. Then at step 70 the processor selects the minimum of the local terrain map elevation and the stored approach area elevation that was calculated at 66.

A variation (Option 1b) of the query-the-ramp embodiment is illustrated in FIG. 4. At query time 54, the processor tests at step 72 whether the query location is within the approach area. If the aircraft is not within the approach area the processor simply gets elevation data from the local terrain map at step 74. On the other hand, if the aircraft is within the approach area the processor computes the approach area elevations using the plane equations calculated in steps 56 and 58 (FIG. 2). By comparison, Option 1a differs from Option 1b in that Option 1a selects the minimum of the computed elevation and the local terrain map elevation, whereas Option 1b favors the computed elevation when within the approach area. Option 1b requires somewhat less computational effort, potentially at the expense of some accuracy.

FIG. 5 shows a somewhat different technique (Option 2) that makes adjustments to the local terrain map using the slow update rate function. Thus the processor at 80 computes and stores the elevation data using the plane equations calculated in steps 56 and 58 (FIG. 2). In addition, the processor at 82 also gets the elevation data from the local terrain map. The processor then selects at 84 the minimum of the local terrain map elevation and the approach area elevation (computed using the plane equations). This selected minimum elevation is then used at 86 to adjust the local terrain map. Then at query time 54, the processor may simply get the elevation by querying the local terrain map (which has been adjusted by the Option 2 algorithm).

Options 1a and 1b differ from Option 2 with respect to which data are queried, at query time 54 when the aircraft is within the approach area. Options 1a and 1b query the approach area elevation data, as calculated by the slow update rate function. Option 2 queries the local terrain map data, which potentially has been adjusted by the slow update rate function.

Implementing the Slow Update Rate and Fast Update Rate Functions

The details for implementing the slow update rate function and fast update rate function will now be described according to the following steps:
  Step 1.: Acquire runway data
  Step 2a.: Compute locations of approach ramp points corresponding to a standard runway base end located at the equator
  Step 2b.: Rotate and translate standard points to actual runway location, using equirectangular approximation
  Step 2b(0).: Compute runway length and bearing, in degrees at equator
  Step 2b(1).: Rotate standard coordinates to orient to actual runway base end
  Step 2b(2).: Rotate 180 degrees and translate to orient to actual runway reciprocal end
  Step 2b(3).: Translate rotated points to the actual runway base end location
  Step 2b(4).: Translate rotated points to the actual runway reciprocal end location
  Step 2c.: Compute elevations of each ramp vertex
  Step 3.: Compute plane coefficients for each of the five regions
  Step 4.: If query area point is within the runway approach ramp area—return elevation The steps for performing Option 1a and Option 1b are largely the same. The steps for performing Option 2 differ from Options 1a and 1b in where and how the plane equations are applied. Specifically regarding Option 2:

Instead of using the plane equations at querying time, the algorithm uses the slow update rate function to update or carve the local map.

Steps 1 through 3 are identical, up to the plane coefficients calculation.

Step 4 occurs at a slow update rate function. Every terrain cell near the runway and within each of the predefined regions will have its elevation adjusted using the plane equation for the specific region.

Step 1. Acquire Runway Data

Figure 6:
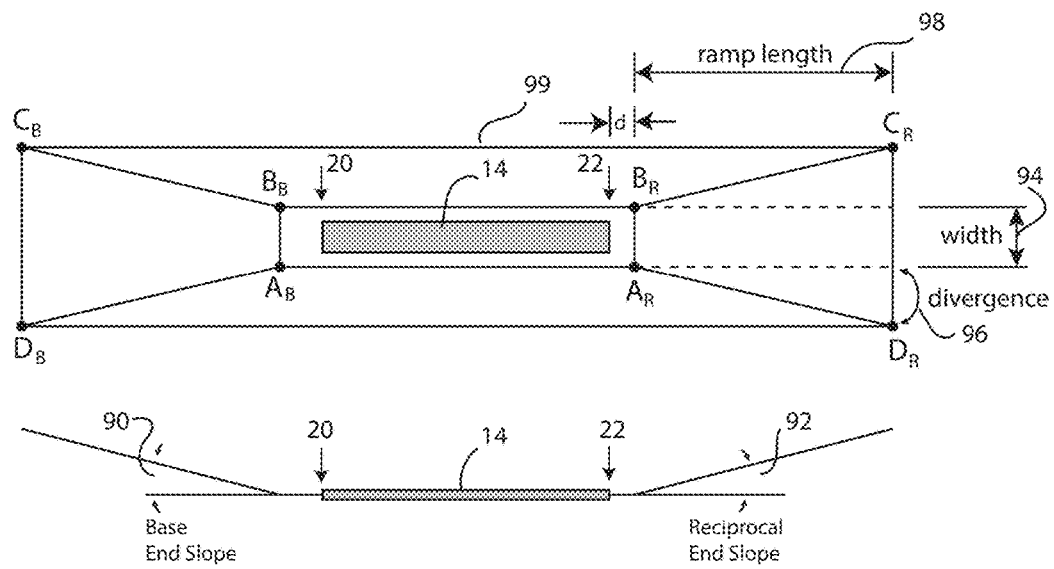
FIG. 6 is a runway approach ramp area diagram useful for understanding definition of terms used in the algorithms.

In performing the slow update function, the processor uses the acquired landing runway data to calculate various numerical components illustrated in FIG. 6, including:

Base End longitude, latitude and elevation (see FIG. 6, at 20)

Base end minimum approach glideslope (see FIG. 6, at 90)

Reciprocal End longitude, latitude and elevation (see FIG. 6 at 22)

Reciprocal End minimum approach glideslope (see FIG. 6, at 92)

Runway width (see FIG. 6, at 94)

With reference to FIG. 6, the processor calculates the positions of points $A_B$, $B_B$, $C_B$, and $D_B$ proximate the base end 20 and of points $A_R$, $B_R$, $C_R$, and $D_R$ proximate the reciprocal end 22 based on predetermined values (exemplary values given below):

Distance from threshold, d=60 meters (See FIG. 6, at d)

Ramp length, rampLength=1 nautical mile (see FIG. 6, at 98)

Divergence=15% (see FIG. 6 at 96)

width=Runway Width (exemplary value 150 ft.) multiplied by predetermined factor (exemplary value 3) (see FIG. 6, at 94)

slope=approach glideslope (assume 3 degrees, if not available) minus predetermined factor (exemplary value 1.5 degrees). (See base end slope FIG. 6 at 90; see reciprocal end slope FIG. 6 at 92)

2a. Compute Locations of Points for Standard Base End

The processor invokes the slow update rate function 60 once new runway definition information is available. The processor computes, as follows, the locations of points A, B, C, D, in degrees, for a standard base end located at 0° longitude and 0° latitude:

$A = [-d\_\text{meters}/1852, +1.5*\text{runwayWidth\_ft}/6076]/60;$ $B = [A(1), -A(2)];$ $C = [-\text{rampLength\_nm} + d\_\text{meters}/1852, \ldots$ $-(1.5*\text{runwayWidth}/6076 +$
$\text{rampLength\_nm}*\text{divergence\_pct})]/60;$ $D = [-C(1), +C(2)].$ By way of example, for a 200 ft runway width, 1 nautical mile ramp, and a 15% divergence, points A, B, C, D would be computed as follows (expressed as floating point numbers, in degrees of latitude and longitude at the equator):

$A = [-5.399567e{-}4, +8.228934e{-}4]$ $B = [-5.399567e{-}4, -8.228934e{-}4]$ $C = [-1.720663e{-}2, -3.322893e{-}3]$ $D = [-1.720663e{-}2, +3.322893e{-}3]$

2b. Rotate and Translate Standard Points to Actual Runway Location

Next, the processor rotates and translates the standard A, B, C, D points to the actual runway location using an equirectangular approximation algorithm. Other rotation and transformation algorithms (e.g., haversine formula, spherical law of cosines, etc.) can be used if improved accuracy is required. However, the equirectangular approximation algorithm is chosen here because it is computationally efficient—requiring only one trigonometric calculation, one square root calculation and a few multiplications and additions.

Figure 7:
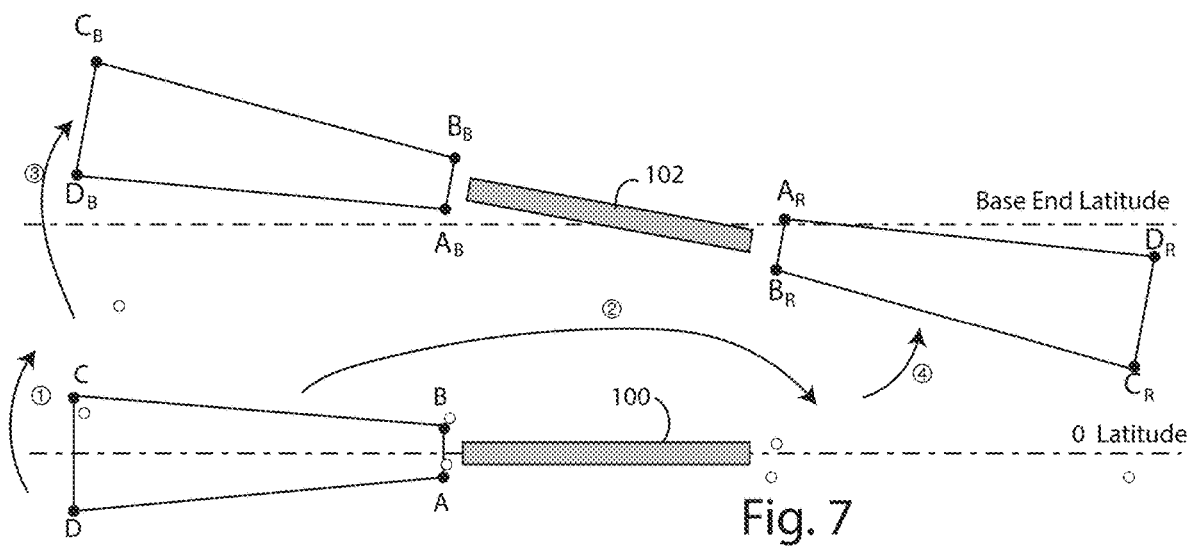
FIG. 7 is a pair of runway approach ramp diagrams illustrating the standard runway being rotated and translated into the actual runway.

FIG. 7 illustrates the rotation and translation process whereby the standard runway 100 is transformed into the actual runway 102 through a series of rotations and translations illustrated at (1)-(4). The base end 20 and reciprocal end 22 are individually handled. Thus in FIG. 7 operation (1) rotates the base end 20 of the standard runway 100; operation (2) rotates again by 180 degrees to get the ramp oriented for the reciprocal end 22. Operation (3) translates the points from operation (1) to get the ramp in the same location as the actual runway 102 base end; operation (4) translates the points from operation (2) to get the ramp in the same location as the actual runway 102 reciprocal end. The algorithm is based on the assumption that all runways are straight lines, which simplifies the calculation by defining the ramp for only the base end of the "standard runway." This allows computing the reciprocal end of the standard runway by a simple 180 degree rotation (which doesn't require any trigonometric function). To maximize computational efficiency, some basic data that are re-used in later steps are pre-computed and stored. This allows the whole operation to be performed while computing a single sine and a single cosine (trigonometric functions that are CPU throughput intensive).

Theoretically, the order of operations within the slow update rate function doesn't matter, but to keep the algorithm simple and computationally efficient the order does matter. Rotating points at the equator, where the distance covered by 1 degree of longitude is basically the same as 1 degree of latitude is simpler (only requires one sine and one cosine of the rotation angle, plus a couple of multiplications and additions/subtractions). Rotating points that are away from the equator, where the size 1 degree of longitude decreases as latitude increases, is way more complex. Thus in the disclosed algorithm, rotation is performed first and translation is performed thereafter.

In detail the equirectangular approximation computes bearing and length, in degrees at the equator. For clarity, Step 2b has been subdivided below into sub-steps:

Step 2b(0). Compute Runway Length and Bearing, in Degrees at Equator, Using Equirectangular Approximation $\cos \text{Lat} = \cos((b\text{Lat} + r\text{Lat})/2);$ $\text{deltaLon} = (r\text{Lon} - b\text{Lon})*\text{abs}(\cos \text{Lat});$ $\text{deltaLat} = (r\text{Lat} - b\text{Lat});$ $\text{length\_deg} = \text{sqrt}(\text{deltaLon}^2 + \text{deltaLat}^2);$ $\sin \text{Theta} = \text{deltaLat}/\text{length\_deg};$ $\cos \text{Theta} = \text{deltaLon}/\text{length\_deg};$ Where:
bLat=Runway Base End Latitude
bLon=Runway Base End Longitude
rLat=Runway Reciprocal End Latitude rLon=Runway Reciprocal End Longitude
Theta=Runway "Bearing"
Step 2b(1). Rotate Standard Coordinates to Orient to Actual Runway Base End $$R = \begin{bmatrix} \cos\text{Theta} & -\sin\text{Theta} \\ \sin\text{Theta} & \cos\text{Theta} \end{bmatrix}$$

$A_{ROT} = R * A$ $B_{ROT} = R * B$ $C_{ROT} = R * C$ $D_{ROT} = R * D$

Step 2b(2) Rotate 180 Degrees and Translate to Orient to Actual Runway Reciprocal End $$R_{180} = \begin{bmatrix} -1 & 0 \\ 0 & -1 \end{bmatrix} T_R = \begin{bmatrix} deltaLon \\ deltaLat \end{bmatrix}$$

$A_{ROT180} = R_{180} * A_{ROT} + T_R$ $B_{ROT180} = R_{180} * B_{ROT} + T_R$ $C_{ROT180} = R_{180} * C_{ROT} + T_R$ $D_{ROT180} = R_{180} * D_{ROT} + T_R$

Step 2b(3) Translate Rotated Points to Actual Runway Base End Location, Using Equirectangular Approximation:

$$M = \begin{bmatrix} \frac{1}{\cos Lat} & 0 \\ 0 & 1 \end{bmatrix} T = \begin{bmatrix} bLon \\ bLat \end{bmatrix}$$

$A_B = M * A_{ROT} + T$ $B_B = M * B_{ROT} + T$ $C_B = M * C_{ROT} + T$ $D_B = M * D_{ROT} + T$

Step 2b(4) Translate Rotated Points to the Actual Runway Reciprocal End Location, Using Equirectangular Approximation:

$A_R = M * A_{ROT180} + T$ $B_R = M * B_{ROT180} + T$ $C_R = M * C_{ROT180} + T$ $D_R = M * D_{ROT180} + T$

Step 2c. Compute Elevations of Each Ramp Vertex
  Compute points AB and BB elevations to be identical to the runway base end elevation
  Compute points AR and BR elevations to be identical to the runway reciprocal end elevation
  Using small angles approximation, compute points CB and DB elevations to be equal to: runway base end elevation+rampLength×(rampSlope)×pi/180°
  Using small angles approximation, compute points CR and DR elevations to be equal to: runway reciprocal end elevation+rampLength× (rampSlope)×pi/180°
Step 3. Compute Plane Coefficients for Each of the Five Regions Next the processor computes plane coefficients for each of the five regions illustrated in FIG. 8: Ramps R1-R4 and Runway. Points to be used:

Runway: $A_B, B_B, (A_R + B_R)/2$

R1: $(A_B + B_B)/2, C_B, D_B$

R2: $A_B, B_R, D_B$

R3: $(A_R + B_R)/2, C_R, D_R$

R4: $A_R, B_B, C_B$

Given three points A, B, C, the plane coefficients a, b, c, d are defined as: function [a, b, c, d]=planeCoefficients(A, B, C)

$a = (B_Y - A_Y) * (C_Z - A_Z) - (B_Z - A_Z) * (C_Y - A_Y)$ $b = -((B_X - A_X) * (C_Z - A_Z) - (B_Z - A_Z) * (C_X - A_X))$ $c = (B_X - A_X) * (C_Y - A_Y) - (B_Y - A_Y) * (C_X - A_X)$ $d = a * A_X + b * A_Y + c * A_Z$ end.
Where X=Longitude, Y=Latitude, Z=Elevation.
Fast Update Rate Function—Performed at Terrain Query Time
Get Query Inputs:
Query Longitude
Query Latitude
Query Uncertainty
The Query Area is defined by four points defined using the Query Inputs above: [Longitude+Uncertainty, Latitude+Uncertainty] [Longitude−Uncertainty, Latitude+Uncertainty] [Longitude−Uncertainty, Latitude−Uncertainty] [Longitude+Uncertainty, Latitude−Uncertainty]

Figure 8:
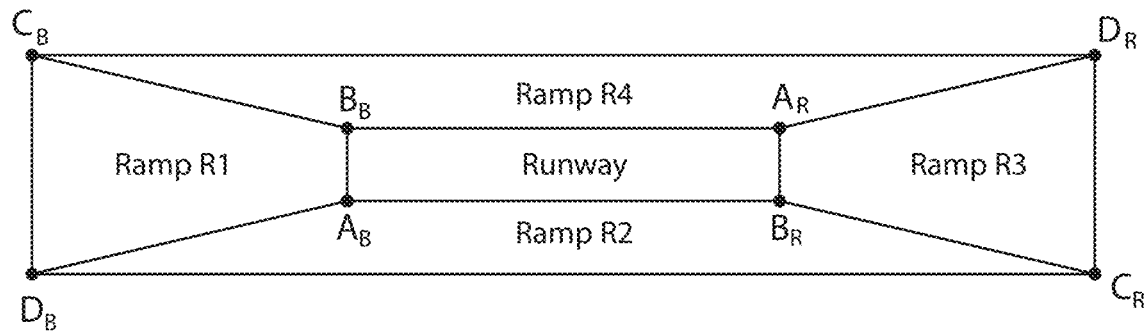
FIG. 8 is a runway approach ramp diagram useful in identifying the five regions applicable to the carving algorithm.

With reference to FIG. 8, the processor checks if each query area point is within the runway approach ramp area defined by points $C_B$, $D_B$, $C_R$, $D_R$. In lieu of checking that all four corners of the query area is within the runway ramp area, another option is to check a single point (the query point) and then check that the uncertainty is less than the approach ramp area width.

Figure 9:
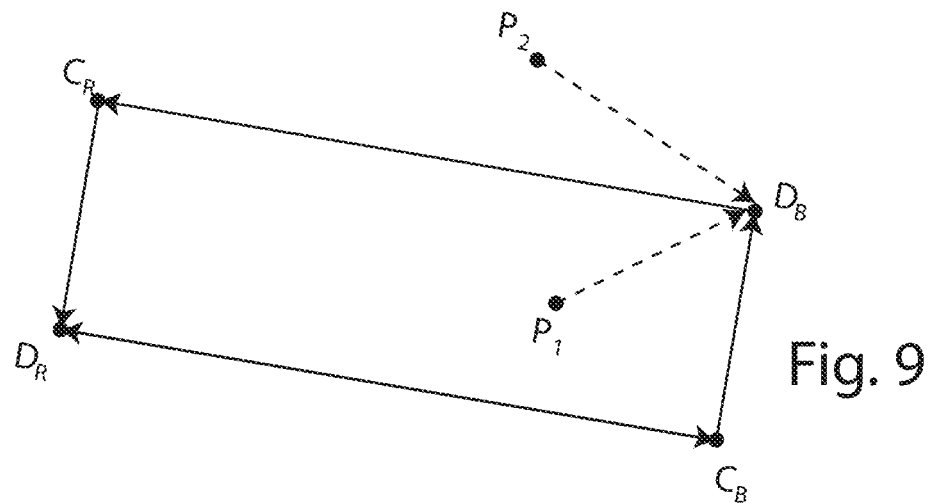
FIG. 9 is vector diagram useful in understanding the process used to define if a query location is inside the runway approach ramp area.

A point can be checked to be within a convex polygon by computing four cross-products between the:
Vector from the point to one of the vertices
Vector from said vertex and next vertex
Repeat for all polygon sides
If all four cross-products have the same sign, then the point is within the polygon. In the example shown in FIG. 9, the cross-product between $P_1 D_B$ and $D_B C_R$ is positive, while the cross-product between $P_2 D_B$ and $D_B C_R$ is negative.
Algorithm for Checking if a is within a Convex Polygon
Define vector as subtraction between two points:

$v\_sub(A,B) = [A_X - B_X, A_Y - B_Y]$;

Define cross-product as:

$x\_product(A,B) = A_X * B_Y - A_Y * B_X$

For each line segment in the polygon:
Define the vector between the point and the origin of the line segment, e.g.:

$a = v\_sub(A, P1)$

Define the line segment as a vector between the two vertices of the segment, e.g.:

$b = v\_sub(B, A)$

Compute the x-product between both vectors:

prod=x_product(a,b)

Repeat for all four segments.
If all cross products have the same sign and are all different from zero, then the point is inside polygon
Step 4. If Query Area Point is within the Runway Approach Ramp Area, then:
The returned approach area elevation is the maximum elevation computed using the plane equation for the 5 regions:

elev=(d−a*x−b*y)/c

Where: a, b, c, d=plane coefficients computed on step 3; x=longitude; y=latitude As noted above, in Option 2, instead of using the plane equations at querying time, the algorithm uses the slow update rate function to update or carve the local map. Steps 1 through 3 are identical, up to the plane coefficients calculation. Step 4 occurs at a slow update rate function. Every terrain cell near the runway and within each of the predefined regions will have its elevation adjusted using the plane equation for the specific region.

Exemplary Hardware Embodiment

FIG. 10 shows exemplary hardware embodiment of a processor-based system for implementing the terrain carving operations discussed above. The terrain carving system, shown generally at 124, is designed to provide elevation data to a terrain collision avoidance system 120 onboard the aircraft. In this regard, the terrain collision avoidance system 120 may be a terrain awareness system (TAWS), a ground proximity warning system (GPWS) or other type of collision avoidance system that requires an elevation signal to generate warnings or command automated avoidance maneuvers. As illustrated, the terrain collision avoidance system may include a map data store 122, such as a computer readable database of map terrain data stored in memory. As discussed above, such map terrain data are often stored as grids or tiles, each grid or tile representing a unique area of terrain associated with a latitude-longitude coordinate and an elevation (typically representing the highest point in that grid or tile).

The terrain carving system 124 includes a processor 126 programmed to implement the carving algorithm 128 according to the explanation above. The program code for executing the carving algorithm is stored in a suitable memory accessible to the processor 126. In addition, the system 124 will also include sufficient system memory 130 in which to store the intermediate calculations performed by the slow update rate function and the fast update rate function, and also to store a working copy of map data to support the local terrain map adjustment step 86 (FIG. 5) if the Option 2 algorithm is being implemented.

In order for the processor 126 to capture the query location 54 (FIG. 2), the processor is coupled to a suitable location sensor 132, such as a GPS receiver. Other navigation systems and altimeter sensors may also be used. The processor may also be provided with approach course data and approach glideslope data from the aircraft's existing avionics system 134.

What is claimed is:

1. A method of adjusting at least one of vertical resolution and vertical accuracy of terrain elevation data for a terrain avoidance and warning system onboard an aircraft traveling along an approach ramp towards an aircraft runway, comprising:

before a query time when terrain elevation at a query location for the aircraft is to be computed by the terrain avoidance and warning system to check that a future trajectory of the aircraft will not interfere with terrain:
acquiring landing runway data for the aircraft runway, the landing runway data comprising runway database elevation values;
computing approach area elevation values, based on the acquired landing runway data, for locations within an approach area that includes the aircraft runway;
obtaining a local terrain map, which is loaded in computer memory onboard the aircraft, the local terrain map comprising local terrain elevation values;
selecting minimum values of the computed approach area elevation values and corresponding local terrain elevation values, resulting in selected minimum elevation values;
adjusting the local terrain map with the selected minimum elevation values, resulting in an adjusted local terrain map; and
supplying the adjusted local terrain map to the terrain avoidance and warning system; and after the query time:
operating the terrain avoidance and warning system and querying the adjusted local terrain map to predict the future trajectory of the aircraft and to check if the future trajectory will intercept with terrain in the future.

2. The method of claim 1 wherein the local terrain map is obtained by wireless transmission from an earth-based system, use of a terrain database onboard the aircraft or combinations thereof.

3. A system for adjusting at least one of vertical resolution and vertical accuracy of terrain elevation data for an aircraft traveling along an approach ramp towards an aircraft runway, the system comprising:
a terrain avoidance and warning system onboard the aircraft;
a data source comprising a local terrain map, which is loaded in computer memory onboard the aircraft, the local terrain map comprising local terrain elevation values; and
at least one processor programmed to:
before a query time when terrain elevation at a query location for the aircraft is to be computed by the terrain avoidance and warning system to check that a future trajectory of the aircraft will not interfere with terrain:
acquire landing runway data for the aircraft runway, the landing runway data comprising runway database elevation values;
compute approach area elevation values, based on the acquired landing runway data, for locations within an approach area that includes the aircraft runway;
receive the local terrain map supplied by the data source;
select minimum values of the computed approach area elevation values and corresponding local terrain elevation values, resulting in selected minimum elevation values;
adjust the local terrain map with the selected minimum elevation values, resulting in an adjusted local terrain map; and
supply the adjusted local terrain map to the terrain avoidance and warning system; and after the query time:
  operate the terrain avoidance and warning system and query the adjusted local terrain map to predict a future trajectory of the aircraft and to check if the future trajectory will intercept with terrain in the future.

4. The system of claim 3, wherein the local terrain map is obtained by wireless transmission from an earth-based system, use of a terrain database onboard the aircraft or combinations thereof.

* * * * *